S. CIRI.
CAR FENDER FOR TRAMWAYS AND THE LIKE.
APPLICATION FILED JUNE 12, 1909.
944,075.
Patented Dec. 21, 1909.
2 SHEETS—SHEET 2.
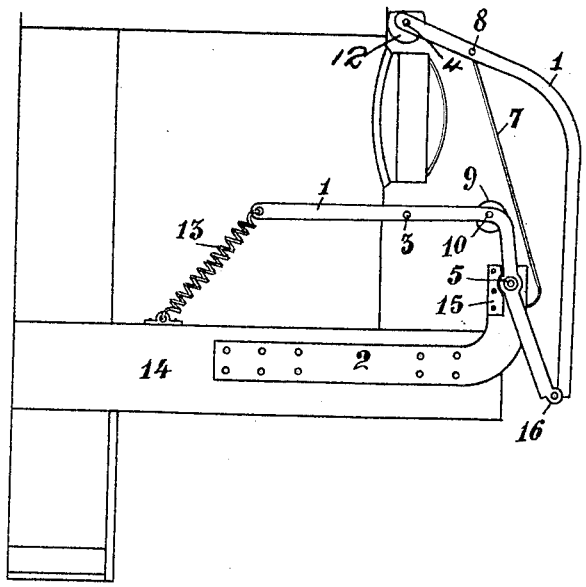
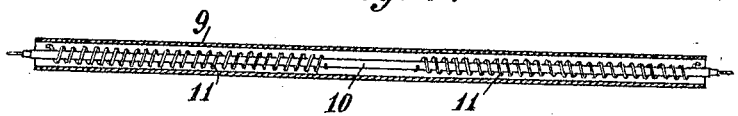
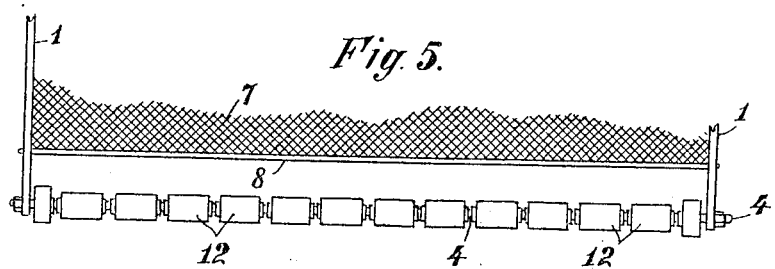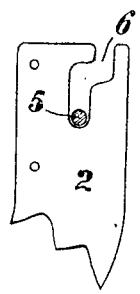
Witnesses
L. Lang
E. Schallinger
Inventor
Silvio Ciri

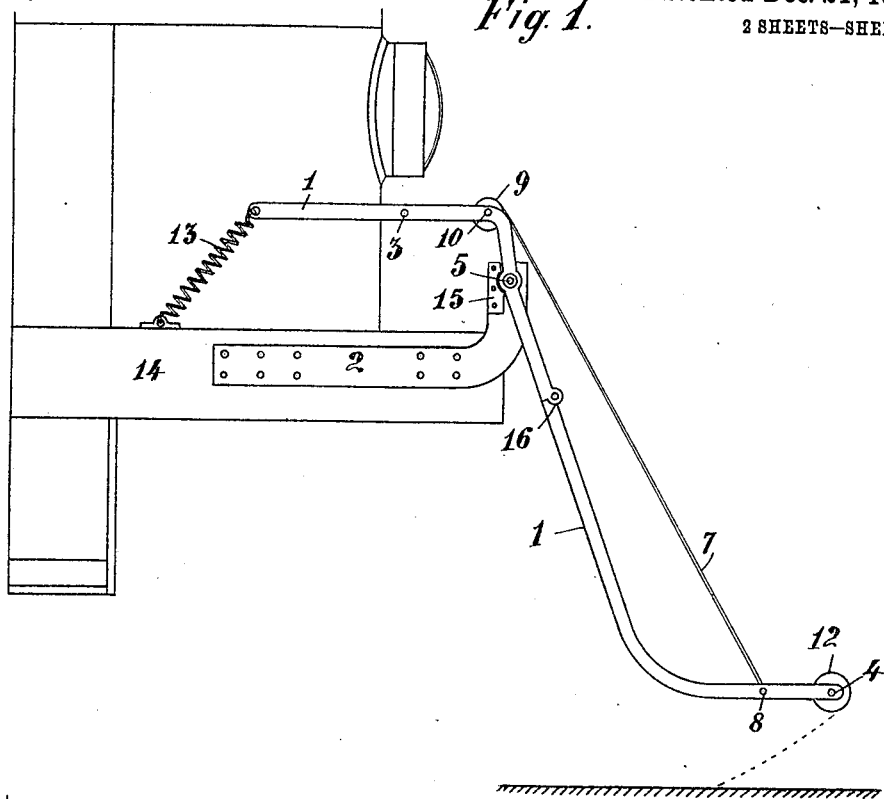
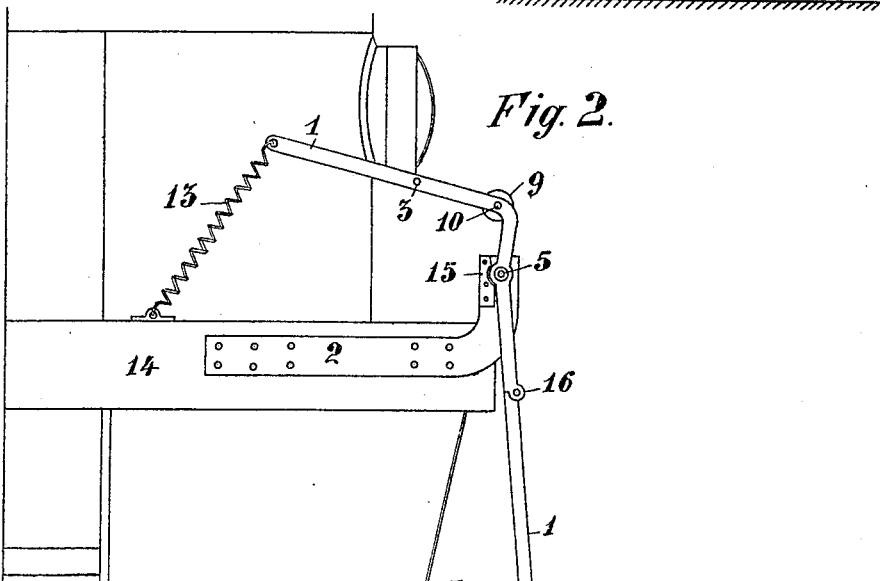

UNITED STATES PATENT OFFICE.

SILVIO CIRI, OF ROME, ITALY.

CAR-FENDER FOR TRAMWAYS AND THE LIKE.

944,075.  Specification of Letters Patent.  Patented Dec. 21, 1909.

Application filed June 12, 1909. Serial No. 501,774.

*To all whom it may concern:*

Be it known that I, SILVIO CIRI, a subject of the Kingdom of Italy, residing in the city of Rome, Kingdom of Italy, have invented certain new and useful Improvements in Car-Fenders for Tramways and the Like, of which the following is a specification.

The object of the present invention is a car fender which when fitted to the front end of tramway-cars, and the like, will diminish the violence of the shock in the case of somebody having been run down and prevents the wheels of the car from crushing the body of the person or injuring same. Moreover this apparatus is made in such a way that in the case of a car being pulled by a tractor, the fender can be raised up so as not to produce any difficulty in coupling the car and that the apparatus can easily be removed if required.

In the annexed drawing is shown by way of example, an embodiment of the said car fender and Figures 1 and 2 are two side-views in elevation of the device fitted on a car shown respectively in normal position and in the position which it takes up when a shock has occurred. Fig. 3 is another side view in elevation of the device raised up and in the position in which it is brought when the car is coupled to a towing car. Figs. 4 and 5 and 6 show constructive details.

The apparatus consists substantially of two lateral arms —1— supported by means of brackets —2— fastened to the frame of the car. These two arms are connected together by means of cross bars —3—4— provided near their upper and lower ends and can rock about a shaft —5— which rests on the brackets —2— within grooves —6— so shaped that while they prevent the jumping out of the shaft when the same is pushed upward, they allow of the shaft being easily taken out when the apparatus is to be removed.

Between the rocking arms is located a strong apron —7— consisting of cloth, wire gauze or any other material which has about the same width as the front of the car. Said apron at its lower edge is fastened to a cross bar —8— and at the upper end wound upon a hollow shaft —9—. This shaft is loose upon a shaft —10— and under the action of springs —11— it continually tends to wind up the cloth —7—, so that normally the latter is perfectly stretched in the position shown in Fig. 1.

Upon the cross bar —4— are mounted elastic rollers —12— which meet any person or object lieing on the track. The upper part of each of the arms —1— is bent backward horizontally and at its end is connected by a spring —13— to the side-frames —14— of the car, and said spring has such a strength that the apparatus under the action of the spring and of its own weight, under normal conditions takes up the position shown in Fig. 1 with the shaft —4— carrying the elastic rollers —12— at a little distance above the ground. Stops —15— provided on the faces of the brackets —2— prevent springs —13— from elevating the front of the fender any higher.

The working of this apparatus may now easily be understood. Should it happen that the shaft —4— carrying the elastic rollers —12— meets with a voluminous body which falls against the apron —7—, then the whole apparatus oscillates around the shaft —5— until the rollers —12— touch the ground as shown in Fig. 2. The apron —7—, through the weight of the body falling upon it unwinds from the shaft —9— and bends so as to form a kind of cradle, and catch the person. The shape which the cloth takes is shown in Fig. 2.

The arms —1— can turn around a pivot —16— so that, before coupling the car to a tractor the apparatus can be raised up, as shown in Fig. 3, thus obviating any difficulty in effecting the coupling. For removing the apparatus, one needs only to raise the shaft 5, carrying the fender, and slide it out of the grooves 6 provided in the brackets 2.

Having now fully described this my invention and how the same is to be carried out, I declare that what I claim is:

1. A car fender for tramways and the like comprising two rocking arms provided on the front end of the car, cross bars connecting the said two arms, an extensible apron stretched between them and opposing springs which normally keep the arms in such a position that their ends are somewhat raised from the ground and allow them to yield resting with the said lower ends against the ground when a heavy body falls upon the cloth yieldingly stretched between said two arms, for the purposes set forth in the specification.

2. A car fender comprising two rocking arms provided on the front end of the car, cross bars connecting said arms, elastic rollers on the cross bar which connects the lower ends of the two arms and comes into contact with the bodies which obstruct the track, an apron which can be wound up and which is stretched between the two oscillating arms and opposing springs which connect the upper ends of the oscillating arms with the frame of the car, for the purposes set forth in the specification.

3. A car fender for tramways and the like comprising two rocking arms connected together by means of cross bars, opposing springs which connect the upper ends of the rocking arms to the frame of the car, an apron which can be wound up stretched between the two oscillating arms, a winding hollow shaft for said apron loose upon a cross bar and springs connecting the cross bar with hollow shaft on which the apron is wound, in such a way that the apron is normally kept stretched, and only unwinds when a heavy body falls upon same.

4. A car fender for tramways and the like comprising two rocking arms connected by means of cross bars, an apron which can be wound up and which is secured between said arms, opposing springs which connect the said two arms with the frame of the car and hinges provided in the two arms which allow of the apparatus being raised up when the car is coupled to a tractor, for the purposes set forth in the specification.

In testimony whereof I have hereunto set my hand in the presence of two subscribing witnesses, this 29th day of May 1909 in the city of Rome, Italy.

SILVIO CIRI.

Witnesses:
RENOCHO SEEVOLA,
ANTONIO LABOCCETTO.